(12) United States Patent
Block et al.

(10) Patent No.: US 9,021,809 B2
(45) Date of Patent: May 5, 2015

(54) METHOD FOR OPERATING A STEAM TURBINE POWER PLANT AND ALSO DEVICE FOR GENERATING STEAM

(75) Inventors: Ditmar Block, Cologne (DE);
Hans-Joachim Klutz, Erfstadt (DE)

(73) Assignee: RWE Power Aktiengesellschaft, Essen (DE)

( * ) Notice: Subject to any disclaimer, the term of this patent is extended or adjusted under 35 U.S.C. 154(b) by 1541 days.

(21) Appl. No.: 12/600,332

(22) PCT Filed: Apr. 12, 2008

(86) PCT No.: PCT/EP2008/002912
§ 371 (c)(1),
(2), (4) Date: May 10, 2010

(87) PCT Pub. No.: WO2008/138441
PCT Pub. Date: Nov. 20, 2008

(65) Prior Publication Data
US 2010/0212320 A1    Aug. 26, 2010

(30) Foreign Application Priority Data

May 16, 2007 (DE) .................. 10 2007 023 336

(51) Int. Cl.
*F01K 7/20*    (2006.01)
*F01K 17/06*    (2006.01)
(Continued)

(52) U.S. Cl.
CPC .................. *F01K 17/06* (2013.01); *F22B 35/00* (2013.01); *F22G 5/123* (2013.01); *F26B 3/08* (2013.01); *F26B 25/22* (2013.01)

(58) Field of Classification Search
USPC .................. 60/653, 677, 662, 663, 660, 664; 110/224, 233, 234
See application file for complete search history.

(56) References Cited

U.S. PATENT DOCUMENTS 3,034,771 A    5/1962   Harris
4,291,539 A *   9/1981   Potter .............................. 60/670
(Continued)

FOREIGN PATENT DOCUMENTS

AT     242715    10/1965
AT     345769    10/1978
(Continued)

OTHER PUBLICATIONS

International Search Report and Written Opinion dated Feb. 9, 2010 issued in PCT Application No. PCT/EP2008/002912, 16 pages. English language translation not available.
(Continued)

*Primary Examiner* — Kenneth Bomberg
*Assistant Examiner* — Jonathan Matthias
(74) *Attorney, Agent, or Firm* — Grossman Tucker Perreault & Pfleger, PLLC

(57) ABSTRACT

The invention refers to a method for operating a steam turbine power plant, and also a device for generating steam for the purpose of power generation.
The method for operating a steam turbine power plant comprises at least one steam generator which is fired with a solid, granular fuel, for example with brown coal, wherein the fuel is first subject to an indirect drying in a fluidized bed drier and the fluidized bed drier is at least partially heated with steam from the water-steam cycle of the steam generator. The method is characterized in that temperature controlling in the drier is carried out in two stages in dependence upon the moisture content of the fuel, wherein first of all the temperature of the fluidized bed drier is controlled via the steam pressure of the heating steam and downstream of this controlling, a controlling of the superheating temperature of the heating steam is carried out in dependence upon the steam pressure.

14 Claims, 1 Drawing Sheet

(51) Int. Cl.
   *F22B 35/00*   (2006.01)
   *F22G 5/12*    (2006.01)
   *F26B 3/08*    (2006.01)
   *F26B 25/22*   (2006.01)

(56) References Cited

U.S. PATENT DOCUMENTS

| | | | |
|---|---|---|---|
| 5,146,857 A | * | 9/1992 | Spliethoff et al. ............ 110/234 |
| 5,419,267 A | | 5/1995 | Raiko |
| 5,911,488 A | | 6/1999 | Geromini et al. |
| 5,940,984 A | | 8/1999 | Moren |

FOREIGN PATENT DOCUMENTS

| | | |
|---|---|---|
| DE | 1053526 | 3/1959 |
| DE | 3835427 | 4/1990 |
| DE | 3835428 | 4/1990 |
| DE | 19518644 | 11/1996 |
| DE | 19612186 | 10/1997 |
| DE | 19627626 | 1/1998 |
| DE | 10319477 | 11/2004 |
| GB | 981774 | 1/1965 |
| JP | 62174292 | 7/1987 |
| RU | 2298744 | 5/2007 |
| UA | 61581 | 11/2003 |
| WO | 95/22035 | 8/1995 |

OTHER PUBLICATIONS

International Preliminary Report dated Jun. 3, 2010 issued in PCT Application No. PCT/EP2008/002912, 6 pages.

* cited by examiner

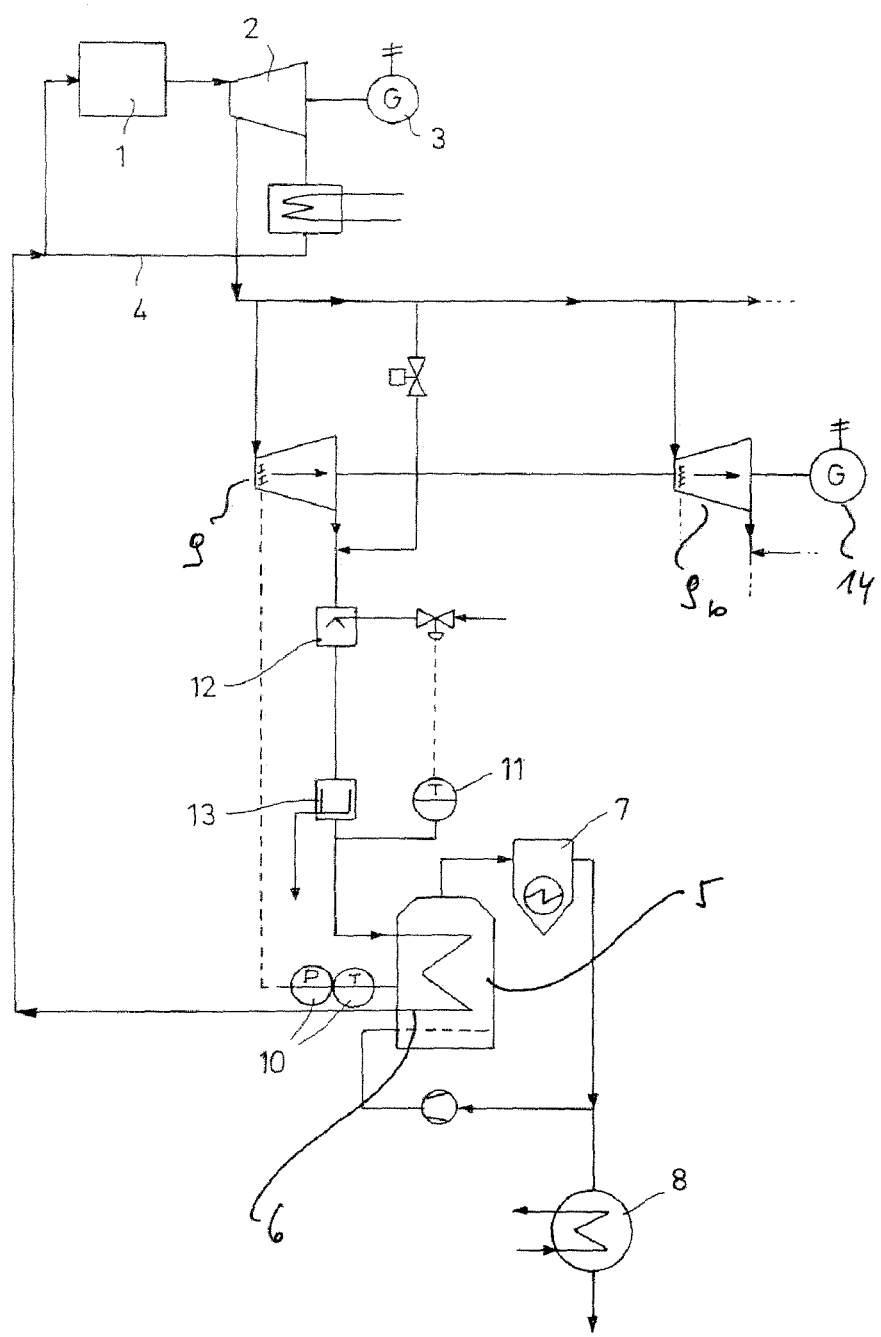

METHOD FOR OPERATING A STEAM TURBINE POWER PLANT AND ALSO DEVICE FOR GENERATING STEAM

The invention refers to a method for operating a steam turbine power plant with at least one steam generator which is fired with a solid, granular fuel, wherein the fuel is first subject to indirect drying in a fluidized bed drier and the fluidized bed drier is at least partially heated with steam from the water-steam cycle of the steam generator.

The invention furthermore refers to a device for generating steam, comprising at least one drier for drying pit-wet brown coal, at least one steam generator which is fired with brown coal, and at least one steam turbine, with a generator, which is connected downstream to the steam generator, wherein the drier has at least one heat exchanger which is exposed to admission of heating steam and connected to the water-steam cycle of the steam generator.

A method and a device for generating process steam for driving a turbine are known for example from DE 195 18 644 A1. For this purpose, brown coal is combusted in a dust-fired boiler. In the case of the method, the brown coal which is to be dried is continuously dried in a fluidized bed drier and the fluidized bed drier is indirectly heated inter alia with tapped steam from the water-steam cycle of the power plant in order to remove at least some of the moisture as vapor from the brown coal. The extracted vapor and the dried coal are removed from the drier. In order to be able to conduct the drying energetically as efficiently as possible, it is proposed in DE 195 18 644 A1 that at least a partial flow of the vapor is compressed and fed to the heat exchanger as heating medium, wherein the vapor at least partially condenses. The drier is furthermore indirectly heated by means of a further heat exchanger which is exposed to throughflow by a partial flow of the process steam before or after its at least partial expansion, at least partially forming condensate.

It is basically known, as is also already embodied in DE 195 18 644, that as a result of drying the brown coal before firing in the steam generator of a power plant a significant increase of efficiency can be achieved. As a result of drying, the water content, which in the case of pit-wet brown coal is about 45 to 65%, can be reduced to about 10 to 25%. This results inter alia in evaporation of this moisture in the combustion chamber of the steam generator being no longer necessary so that additional emissions and heat losses can be avoided.

The aforesaid naturally also applies to other wet organic fuels.

It is basically known from a very wide variety of methods to extract at least some of the energy which is used for the drying process of the fuel in the drier directly from the water-steam cycle of the power plant process. Heating of the drier is customarily carried out by means of tapped steam of the main turbine of the power plant. This is also provided in this way for example in the method which is described in DE 103 19 477 A1. There, the vapor which results from drying of the fuel is used exclusively for preheating the boiler feed water.

The temperature which is to be set in the drier is normally a function of the moisture of the fuel. Fluidized bed driers are customarily set to the maximum possible water content of the fuel. In practice, however, the moisture content of the fuel is subject to fluctuations. For example, when using brown coal as fuel the moisture content or water content fluctuates between 45 and 65 percent by weight. Such moisture fluctuations of the fuel could previously only be insufficiently taken into consideration when controlling the process. Up to now, the temperature in the drier has been influenced exclusively via a throttling of the heating steam. If less drying capacity, and therefore less steam pressure, than estimated is required, the steam pressure is correspondingly throttled. Controlling of the drier temperature in this way is comparatively simple but energy-wise not optimum.

The invention is therefore based on the object of improving a method and also a device of the aforesaid type with regard to the overall efficiency.

In the case of a method of the type referred to in the introduction, therefore, it is proposed according to the invention that the temperature controlling in the drier is carried out in two stages in dependence upon the moisture content of the fuel, wherein the temperature of the fluidized bed drier is first of all controlled via the steam pressure of the heating steam, and downstream of this controlling, a controlling of the superheating temperature of the heating steam is undertaken in dependence upon the nominal pressure of the heating steam.

The controlling according to the invention advantageously takes into consideration the heat transfer to the heating surfaces in the drier. The heating surfaces are efficiently utilized only in the case of the heating steam condensing. When the heating steam condenses, the liberated heat of condensation is utilized.

According to the method according to the invention, the temperature in the drier can be kept constant by taking into consideration an optimum heat transfer to the heating surfaces. If the drier were to be operated with steam which is superheated by about 60 K, the heat transfer conditions would deteriorate and a part of the heating surface would only be required for reducing the steam superheating before using the efficient steam condensation for heat transfer. As a result, the deteriorated heat transfer requires either a larger heat exchanger surface or a higher heating steam pressure. As a result of the interlinked controlling of pressure and superheating temperature according to the invention, the drier can basically be operated at lower pressure which is advantageous from the point of view of thermodynamics and the power plant process.

The superheating temperature is expediently set at about 1 to 5 K.

In an especially advantageous variant of the method according to the invention, pressure controlling of the heating steam for the drier is carried out by means of at least one back-pressure turbine which is provided in addition to the steam turbine of the steam generating process. This has the advantage that the different heating steam pressures at full load and partial load of the drier can be converted into kinetic energy. The pressure drop between the tapped pressure at the main turbine of the power plant and the pressure which is actually required at the drier is then advantageously used for power generation.

Controlling of the superheating temperature is especially preferably carried out by means of injection cooling with water.

The injecting cooling of the heating steam is expediently undertaken downstream of the back-pressure turbine.

The injection cooling can be carried out with water surplus to the thermodynamically required amount of water, for example with 1 to 7 times the thermodynamically required amount of water in order to achieve a low superheating of 1-5 K. So as not to negatively impair the heat transfer in the drier, the surplus water is separated out before entry into the heat exchanger of the fluidized bed drier.

The back-pressure turbine is expediently bypassed if the pressure drop at this is too low. Such a bypassing is also expedient in the case of failure of the back-pressure turbine.

In an advantageous variant of the method, provision is made to use the vapor which results in the fluidized bed drier for preheating the boiler feed water.

The device for generating steam according to the invention, comprising at least one drier for drying pit-wet brown coal, at least one steam generator which is fired with brown coal, and at least one steam turbine, with a generator, which is connected downstream to the steam generator, wherein the drier has at least one heat exchanger which is exposed to admission of heating steam and connected to the water-steam cycle of the power plant, is characterized in that at least one additional turbine is connected upstream to the heat exchanger for controlling the drier temperature.

The turbine which is connected upstream to the drier is expediently formed as a back-pressure turbine which drives a generator.

In the case of a multiplicity of drier trains which are connected in parallel, a plurality of back-pressure turbines can be arranged on one shaft and drive a common generator, as a result of which the mechanical losses and the investment costs are minimized.

Injection cooling for controlling the superheating temperature of the steam is preferably provided in the flow direction of the heating steam downstream of the turbine which is connected upstream to the drier.

The invention is subsequently illustrated based on a steam generating process which is shown in the attached flow diagram.

The power plant process which is shown in the drawing comprises a steam generator 1, a first turbine 2 and a first generator 3, which constitute the principal components in the water-steam cycle 4.

The steam generator 1 is formed for example as a dust-fired boiler in which brown coal is fired as fuel. The brown coal is pre-dried in the drier which is designated 5. The drier 5 is formed in a known manner as a fluidized bed drier, the fluidized coal being indirectly heated in this via heat exchangers 6. The brown coal, which for example has a moisture content or water content of 60 percent by weight, is dried in the drier at a temperature of about 110° C. to a residual moisture of 12 percent by weight before it is fed to combustion in the steam generator 1. The energy which is required for this is primarily injected into the drier 5 in the form of tapped steam from the first turbine 2 of the power plant. The heating steam which is made available at about 6 bar from the low-pressure section of the first turbine 2, as still to be described below, flows through a heat exchanger 6 of the drier 5. As a result of this, the coal which is fluidized in the drier 5, i.e. which is in the fluidized bed, is indirectly heated. The vapor which is extracted from the drier 5 is freed from dust in an electrofilter 7 and then recondensed in the vapor condenser 8. Some of the vapor which is extracted from the drier 5 can be used in an additional heat exchanger for indirect heating of the drier 5. (This variant is not shown in the drawing). A partial flow of the vapor can also be used in the drier for fluidizing the coal. The heat of condensation which results in the vapor condenser 8 can be used for example for preheating the boiler feed water.

As was already mentioned in the introduction, the tapped steam emerges from the first turbine 2 at a pressure of about 6 bar and is comparatively highly superheated. This for example still has a temperature of about 280° C.

According to the invention, the temperature of for example 110° C. which is to be set in the drier 5 is controlled via the pressure of the heating steam by means of a second turbine 9 which is formed as a back-pressure turbine. The temperature in the drier 5 is kept constant by means of a cascade control system consisting of pressure and temperature controlling.

For this purpose, the turbine pressure of the second turbine 9 is controlled via the temperature and pressure control device 10, in this case the temperature in the drier being the control variable for controlling the turbine pressure. This is carried out via an adjustment of the stator blades of the turbine 9. The drier temperature of for example 110° C. is a function of the desired water content. This results in the present case for example from the moisture content of the dried brown coal of about 12 percent by weight.

The heating steam which results downstream of the second turbine 9 is superheated for example with a temperature of about 60 K which in the case of a required heating steam pressure of for example 3.5 bar (condensation temperature=130° C.) is too much to bring about an immediate condensation in the drier which is necessary for an optimum heat transfer and for utilization of the heat of condensation. For this reason, in addition to the temperature and pressure control device 10 an additional temperature control device 11 is provided according to the invention for controlling the superheating temperature of the heating steam.

The temperature control device 11 is connected to an injection cooler 12 via which the superheating temperature can be controlled by injecting cold water into the heating steam. The temperature control device 11 controls the superheating temperature of the heating steam in dependence upon the heating steam pressure in the heat exchanger of the drier. It is an aim of the control system to cool the steam downstream of the second turbine 9 to a superheating temperature of only 1 to 5 K. For this purpose, injection water with a surplus of about 1 to 7 times the thermodynamically required amount is injected into the injection cooler 12. The surplus water is extracted in a downstream water separator 13.

The second turbine 9, and in the case of a multiplicity of drier trains the additional turbines 9b, c, d, drive a common second generator 14, the electric energy of which, in the same way as the electric energy of the first generator 3, is fed to the grid. In this way, the overall efficiency of the power plant process can be increased by 0.2 to 0.4 percent, which is substantial.

LIST OF DESIGNATIONS

1 Steam generator
2 First turbine
3 First generator
4 Water-steam cycle
5 Drier
6 Heat exchanger
7 Electrofilter
8 Vapor condenser
9 Second turbine
10 Temperature and pressure control device
11 Temperature control device
12 Injection cooler
13 Water separator
14 Generator

What is claimed is:

1. A method for operating a steam turbine power plant, comprising:
   providing at least one steam generator;
   firing a solid, granular fuel in the steam generator;
   indirectly drying the fuel in a drier with at least one heat exchanger,
      wherein the heat exchanger of the drier is at least partially heated with steam from a water-steam cycle of the steam generator;

controlling the temperature in the drier in two stages in dependence upon a moisture content of the fuel,
wherein in a first stage of controlling, a backpressure turbine controls the heating steam nominal steam pressure based on the drier temperature, and
wherein in a second stage of controlling, downstream of the first stage, an injection cooler controls a superheating temperature of the heating steam in dependence upon the nominal steam pressure of the heating steam in the heat exchanger of the drier.

2. The method as claimed in claim 1, wherein the steam is superheated by a value of 1 K to 5 K.

3. The method as claimed in claim 1, wherein the injection cooler controls a superheating temperature of the heating steam by injection cooling of the heating steam with water.

4. The method as claimed in claim 3, wherein the injection cooling is carried out with water surplus to the thermodynamically required amount of water.

5. The method as claimed in claim 4, wherein the surplus water is separated out before entry into the heat exchanger of the drier.

6. The method as claimed in claim 4, wherein the injection cooling is carried out with water surplus of 1 to 7 times the thermodynamically required amount of water to achieve a superheating of 1 K to 5 K.

7. The method as claimed in claim 1, wherein the backpressure turbine is bypassed based on a pressure drop at the backpressure turbine.

8. The method as claimed in claim 1, wherein the vapor of the drier is used for preheating the steam generator feed water.

9. The method as claimed in claim 1, wherein the backpressure turbine drives a second electrical generator.

10. The method as claimed in claim 9, wherein the dried coal is dried brown coal.

11. The method as claimed in claim 1, wherein the solid, granular fuel is dried coal.

12. The method as claimed in claim 11, wherein the dried brown coal is pit-wet brown coal.

13. The method as claimed in claim 1, wherein the drier is a fluidized bed drier.

14. The method as claimed in claim 1, wherein the temperature of the drier is kept constant by a cascade control system consisting of pressure and temperature controlling.

* * * * *